(12) United States Patent
Subotic et al.

(10) Patent No.: US 10,358,588 B2
(45) Date of Patent: Jul. 23, 2019

(54) MODIFIED COLD APPLIED ASPHALT EMULSION

(71) Applicant: HENRY COMPANY LLC, El Segundo, CA (US)

(72) Inventors: Dusan V. Subotic, Toronto (CA); Larisa Kasitskaya, Toronto (CA); Srdjan Stankovic, Toronto (CA)

(73) Assignee: Henry Company, LLC, El Segundo, CA (US)

( * ) Notice: Subject to any disclaimer, the term of this patent is extended or adjusted under 35 U.S.C. 154(b) by 0 days.

(21) Appl. No.: 14/553,100

(22) Filed: Nov. 25, 2014

(65) Prior Publication Data

US 2015/0144250 A1    May 28, 2015

Related U.S. Application Data

(60) Provisional application No. 61/908,910, filed on Nov. 26, 2013.

(51) Int. Cl.

| | |
|---|---|
| *C09D 5/00* | (2006.01) |
| *C09J 7/38* | (2018.01) |
| *E04B 1/62* | (2006.01) |
| *E04B 1/66* | (2006.01) |
| *E04B 1/76* | (2006.01) |
| *C09J 195/00* | (2006.01) |

(52) U.S. Cl.
CPC .......... *C09J 195/005* (2013.01); *C09D 5/002* (2013.01); *E04B 1/625* (2013.01); *E04B 1/665* (2013.01); *C09J 7/38* (2018.01); *C09J 2201/622* (2013.01); *C09J 2495/00* (2013.01); *E04B 1/7612* (2013.01); *Y10T 428/24802* (2015.01); *Y10T 428/249971* (2015.04); *Y10T 428/249981* (2015.04); *Y10T 428/249983* (2015.04)

(58) Field of Classification Search
CPC ..... C09J 7/0207; C09J 2495/00; E04B 1/665; E04B 1/7612; E04B 1/625
See application file for complete search history.

(56) References Cited

U.S. PATENT DOCUMENTS

| | | | | |
|---|---|---|---|---|
| 3,532,589 | A | | 10/1970 | David |
| 3,937,640 | A | * | 2/1976 | Tajima .................. B32B 37/24 156/210 |
| 4,000,140 | A | * | 12/1976 | Tierney .................. C08L 23/16 524/519 |
| 5,004,772 | A | * | 4/1991 | Grzybowski ........... C08L 95/00 524/62 |

(Continued)

OTHER PUBLICATIONS

"Self-adhered sheet air barrier", ABAA Master Specification Section 072713, https://www.airbarrier.org/specs/D-115-011, Aug. 1, 2013, Rev. 13-0, ABAA Section 072761, 1-20.

(Continued)

*Primary Examiner* — Hai Vo
(74) *Attorney, Agent, or Firm* — BakerHostetler

(57) ABSTRACT

Embodiments of the present disclosure are directed to an adhesive asphalt emulsion. The adhesive asphalt emulsion can be prepared in liquid form and applied to a material, such as a film or fabric, to create a self-adhering membrane. In some embodiments, the adhesive can be water vapor permeable, and can be applied in a continuous layer to a membrane. The adhesive asphalt emulsion can be prepared, applied, and in service at low temperatures.

7 Claims, 3 Drawing Sheets

(56) References Cited

U.S. PATENT DOCUMENTS

| | | | |
|---|---|---|---|
| 5,216,053 A | 6/1993 | Jones et al. | |
| 5,317,035 A | 5/1994 | Jacoby et al. | |
| 5,364,894 A | 11/1994 | Portfolio et al. | |
| 5,972,147 A | 10/1999 | Janis | |
| 6,901,712 B2 | 6/2005 | Lionel | |
| 7,735,838 B2 | 6/2010 | Rades et al. | |
| 2002/0110679 A1 | 8/2002 | Miller et al. | |
| 2008/0176022 A1* | 7/2008 | Payne | D04H 11/00 428/91 |
| 2010/0173112 A1* | 7/2010 | Wiercinski | E02D 31/02 428/41.8 |
| 2010/0190892 A1 | 7/2010 | Binkley | |
| 2014/0069297 A1* | 3/2014 | Rotz | C08L 95/00 106/270 |

OTHER PUBLICATIONS

"The Bitumen Industry—The Bitumen Industry (IS-230)", http://www.bitumenuk.com/images/library/files/BitumenIndustry/TheBitumenIndustryMarch2011Edition.pdf, Jan. 1, 2011, 1-43.

Connan, "Use and trade of bitumen in antiquity and prehistory: molecular archaeology reveals secrets of past civilizations", Philosophical Transactions. Royal Society of London. B: Biological Sciences, Jan. 29, 1999, vol. 354, No. 1379, 33-50.

Graham, "Analysing self-adhering underlayments", http://docserver.nrca.net/technical/8741.pd, Nov. 1, 2006, 1-3.

* cited by examiner

MODIFIED COLD APPLIED ASPHALT EMULSION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

A modified asphalt emulsion for use as an adhesive and a method of manufacturing is disclosed.

Description of the Related Art

Moisture problems in walls have been attributed to water vapor diffusion and air leakage. Control of air movement has become recognized as a major factor determining building performance, as measured by how well a building functions during its lifespan. Depending on local climate, air leakage through walls can result in excessive efflorescence, spalling of masonry, frozen pipes, condensation and ice buildup in cavities, wet and dysfunctional insulation, mold growth as well as rain penetration, high energy costs and poor control of the building environment.

Air leakage is the uncontrolled movement of air through the building envelope. This movement of air into a building (infiltration) and out of a building (exfiltration) can be caused by pressure differences produced by wind, stack or chimney effect and fan pressurization. Air leakage may follow such paths as holes or openings through the envelope, for example, cracks or joints between infill components and structural elements or through porous materials such as concrete block and porous insulation materials.

Various techniques have been developed to manage water vapor diffusion and air leakage. For example, self-adhering air and moisture barrier sheet membranes that are permeable to water vapor have been developed for structural surfaces of buildings However, conventional approaches are ill-suited for use in winter temperatures in many parts of world.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed are embodiments of a self-adhering, air and moisture barrier system for structural surfaces of buildings which can comprise a membrane configured to be located on the structural surface, and a vapor permeable asphalt-emulsion adhesive applied to at least one side of the membrane, the adhesive comprising at least one filler, wherein the asphalt-emulsion adhesive is configured to be applied at temperatures as low as about −4° C.

In some embodiments, the asphalt-emulsion adhesive can be applied to the membrane as a continuous coating. In some embodiments, the asphalt-emulsion adhesive can be applied to the membrane as a discontinuous coating. In some embodiments, at least about 99% of the membrane can be coated by the adhesive. In some embodiments, the membrane can be water vapor permeable. In some embodiments, the structural surface can be a wall.

In some embodiments, the membrane can be a water vapor impermeable. In some embodiments, the structural surface can be a roof. In some embodiments, the system can comply with the ASTM D 1970 standard.

In some embodiments, the water vapor permeable asphalt-emulsion adhesive can comprise epoxidized soy bean oil.

In some embodiments, the barrier system can have a service temperature of about −40° C. to about 80° C. In some embodiments, the barrier system can have a service temperature of below freezing temperatures. In some embodiments, the asphalt-emulsion adhesive can be applied at below freezing temperatures.

In some embodiments, the adhesive can comprise about 0 to about 22 wt. % polymer, about 30 to about 36 wt. % asphalt, about 28 to about 40 wt. % water, and at least one filler configured to form at least one passage through the adhesive. In some embodiments, the asphalt-emulsion adhesive does not include a solvent.

Also disclosed is an embodiment of a water vapor permeable adhesive which can comprise about 0 to about 22 wt. % polymer, about 30 to about 36 wt. % asphalt, about 28 to about 40 wt. % water, and at least one filler configured to form at least one passage through the adhesive, wherein the adhesive is configured to be applied at temperatures as low as about −4° C.

In some embodiments, the adhesive can be configured as a primer. In some embodiments, the adhesive can further comprise epoxidized soy bean oil. In some embodiments, the adhesive does not include a solvent. In some embodiments, the adhesive can be applied at below freezing temperatures.

Also disclosed is method of applying a self-adhering, air and moisture barrier sheet which can comprise mixing water, asphalt, polymer, and filler to form an asphalt-emulsion adhesive, applying the asphalt-emulsion adhesive to a membrane to form a continuous film, and applying the membrane having the continuous film of asphalt-emulsion adhesive to a structural component, wherein the asphalt-emulsion adhesive is configured to be applied at temperatures as low as about −4° C. In some embodiments, the adhesive can be applied at below freezing temperatures.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION

Figure 1A:
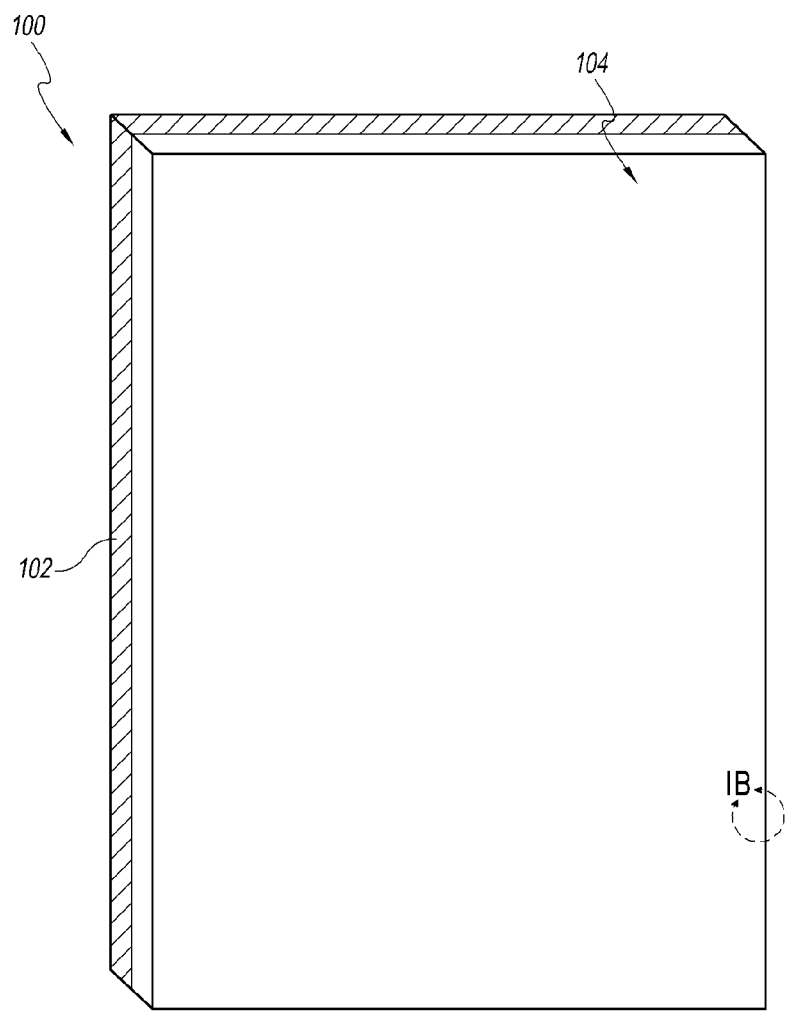
FIG. 1A shows an embodiment of a membrane with an asphalt-emulsion adhesive at a macroscopic level.

Embodiments of the present disclosure provide for a water-vapor permeable adhesive formed from an asphalt emulsion. In some embodiments, the adhesive may be used in conjunction with a membrane, either vapor permeable or vapor impermeable, the combination forming an asphalt-membrane system. The asphalt-membrane system can be used, for example, in construction of houses or commercial buildings, including in walls and in roofing though the particular location of use is not limiting. The system can be self-adhered to certain substrates, thus eliminating or reducing the need for mechanical fasteners and tapes.

Advantageously, embodiments of the asphalt-emulsion adhesive can optionally be prepared, applied, and operated, and can maintain service, at low or extremely low temperatures, which can be valuable over other adhesives. Accordingly, optionally embodiments of the disclosed asphalt-emulsion adhesive can be used in winter climates and do not require the use of any heating components, unlike conventional adhesives.

Additionally, in some embodiments, the asphalt-emulsion adhesive described herein can optionally include at least one filler, which can enable water vapor to pass through the adhesive. Therefore, advantageously, in some embodiments the described adhesive can be water vapor permeable. Embodiments of the asphalt-emulsion adhesive can be used with a membrane, or can be used as a standalone primer.

The term "membrane" as used herein represents any type of layer, flexible sheet, barrier sheet, or film, such as, by way of non-limiting example, a non-woven fabric or polyolefin sheet, which can be permeable or non-permeable to water vapor, and which can act as an air and/or water barrier. The membrane can be configured to be coated by an adhesive, such as example embodiments of the asphalt-emulsion adhesive described in detail herein, so that the adhesive remains on the membrane after coating even at cold temperatures.

The term "asphalt-membrane system" as used herein represents a combination of a membrane, either water vapor permeable or impermeable, having at least one surface coated with an asphalt-emulsion adhesive, such as, by way of example, the cold applied asphalt emulsion described herein.

Asphalt-Emulsion Adhesive

Disclosed herein are embodiments of an adhesive made from an asphalt emulsion. Advantageously, the adhesive can be manufactured at cold temperatures and can be formed to be vapor permeable. Adhesives can be used to bind different surfaces or materials together, and can resist separation. For example, a liquid adhesive, such as glue or epoxy, can be used to adhere surfaces together. The surfaces can be adhered together upon the application of force attempting to part the surfaces. In some embodiments, an asphalt emulsion such as those described below can be used as an adhesive layer.

Certain embodiments of the asphalt emulsions disclosed herein can be advantageous over conventional types of adhesive layers as they can be prepared at relatively lower temperatures and may be easily applied to different surfaces. Embodiments of the disclosed asphalt emulsions do not require the use of high temperatures or outside heat to apply the asphalt emulsions. Accordingly, in some embodiments ambient temperatures can be used. On the other hand, many currently used adhesives require application of the adhesive at temperatures upwards of 80-167° C., which can be difficult or time consuming to achieve in low temperature climates. Embodiments of the asphalt emulsion can also be applied from a solution stent, and no melt is required.

In some embodiments, the asphalt-emulsion adhesive can be applied at low temperatures, such as those in cold or winter climates. For example, the adhesive can be applied from about −4° C. to about 40° C. without substantial negative effects. In some embodiments, the adhesive can be applied below about 23, 20, 15, 10, 5, or 0° C. Therefore, certain embodiments of the asphalt-emulsion adhesive do not require any heating above ambient temperature before application, and can be easily applied in cold weather climates.

Further, the adhesive can have a service temperature of about −40° C. to about 80° C. In some embodiments, the adhesive can have a service temperature of below about 60, 50, 40, 30, 20, 10, 0, or −10° C. In some embodiments, the asphalt-emulsion adhesive can be prepared, applied, and have service life at temperatures below freezing. Accordingly, embodiments of the disclosed adhesive can be used in cold weather climates, and can handle low temperatures without losing adhesive qualities.

Embodiments of the asphalt-emulsion adhesive described herein can also be advantageous as they can be substantially water vapor permeable, unlike many other types of adhesives. The water vapor permeable nature of embodiments of the disclosed asphalt-emulsion adhesive allows for vapor to pass through, thus preventing collection of water vapor which can allow for the formation of mold or rot. This can be done through the inclusion of, for example, fillers.

Fillers, either organic or inorganic, can be used to create a vapor permeable asphalt-emulsion adhesive. For example, filler within the asphalt emulsion can act to create structural imperfections within the adhesive. The structural imperfections can form microscopic pathways, or micropores, through the adhesive. Accordingly, water vapor can diffuse through the pathways caused by the structural imperfections, and can move from one side of the adhesive to the other side. However, the pathways can remain small enough to prevent, for example, liquid or other gasses from passing through the adhesive.

Fillers can include, but are not limited to, calcium carbonate, titanium dioxide, black iron, aluminum trihydrate, elastomeric polymers (e.g., pure acrylic/vinyl acrylic/styrene acrylic latex), and fibers. The fibers can be, for example, polyamide, nylon, polyester, polypropylene, polyurethane. In some embodiments, plasticizers can also help increase the permeability of the asphalt-emulsion adhesive. While the plasticizer itself may not be permeable, it can help open pathways through the adhesive as described above. In some embodiments, the plasticizers can be epoxidized soy bean oil, castor oil, linseed oil, mineral oil, or propylene carbonate.

Accordingly, embodiments of the disclosed can be water vapor permeable due to, at least in part, the structural imperfections formed in the adhesive due to the fillers. Typical liquid adhesives may not water vapor permeable, so the disclosed asphalt-emulsion adhesive can be advantageous if it were to be used in situations where water vapor permeability is desired. These structural imperfections can allow for the diffusion of water vapor through the adhesive, without the need to form gaps in the adhesive. Therefore, embodiments of the asphalt emulsion can be spread on a fabric sheet continuously, as further discussed below.

Asphalt emulsions having advantageous properties as discussed above can be prepared by generally mixing asphalt with water. Asphalt emulsions can also be cationic, anionic, or nonionic depending on a user's particular needs. The process for preparing the asphalt emulsion will be understood by those skilled in the art.

Other materials, such as additives, can be included in the mixtures in addition to asphalt and water to change the properties of the asphalt emulsion. In some embodiments, asphalt emulsions can contain up to about 70% asphalt by weight, and less than 1.5% chemical additives by weight. The chemical additives can include, for example, emulsifying agents and/or filler.

Beneficially, in some embodiments, no solvents are needed to form the asphalt emulsions. This limits the number of components needed to form the asphalt emulsions, thus making it easier for a user to produce.

Table I lists a composition for an embodiment of an asphalt-emulsion adhesive.

TABLE I

Composition of an Embodiment of an Asphalt-Emulsion Adhesive

| Component | Wt. % |
|---|---|
| Defoamer | 0.2-0.3 |
| Pure acrylic/vinyl acrylic/styrene acrylic latex (Vinavil) 0-22% | 0-22 |
| Aquatac 6085 and/or aquatic 6025 waterborne resin (Arizona Chemical) | 0-22 |
| Bentonite Clay | 0.4-1 |
| Asphalt | 30-36 |
| Soap | 4.5-5.4 |
| Rheology Modifier | 1-3 |
| Rheology Additive | 0.3-0.6 |
| Glycol | 2-3.2 |
| Plasticizer | 0-3 |
| Water | 28-40 |

In some embodiments, the asphalt-emulsion adhesive can further contain an acrylic latex, such as a Vinavil® acrylic latex (e.g., in the range of 1%-50% by weight based on total solids). This acrylic can be used to increase the overall adhesion of the asphalt emulsion. However, in some embodiments the acrylic may not be used, and the adhesion properties may not need to be improved. Optionally, certain embodiments do not include any salts, such as water-soluble metal salts, to lower the operational temperature of the asphalt-emulsion adhesive. Various embodiments do not include any hydrophobic acrylic polymers. Some embodiments of the adhesive are not cementitious.

In some embodiments, the asphalt emulsion can also contain modifiers, such as epoxidized, soy bean oil and/or other plasticizer, such as castor oil. Standard formed asphalt emulsion may be adhesive when initially prepared, though it can lose its adhesion relatively quickly. For example, weather and time can have deleterious effects on the asphalt emulsion. However, if soy bean oil or other suitable plasticizer is mixed into the preparation, the length of adhesion can be improved. This can be due, at least partially, to the soy bean oil preventing the asphalt emulsion from completely curing, allowing for increased adhesion time.

In some embodiments, the adhesive can have a well-defined sag resistance, tear strength, tensile strength, elongation, and water absorption. Additionally, the adhesive can have good adhesion to different building properties.

The asphalt-emulsion adhesive, as described above, can be used for many different purposes. In some embodiments, the asphalt-emulsion adhesive can be configured to be applied to a substrate, such as, by way of example, by spraying or rolling the asphalt-emulsion adhesive onto a substrate or a carrier, such as the membranes discussed below. In some embodiments, the membrane can be water vapor permeable, thus forming a system that can regulate water vapor in a building. In some embodiments, the membrane can be water vapor impermeable, and can be used, for example, in roofing where regulation of water vapor may not be required.

Further, the asphalt-emulsion adhesive can be used as a primer coating. For example, the adhesive can be sprayed onto a substrate and another material can be placed on top of it, thereby adhering the substrate to the second material.

Water Vapor Permeable Membrane

In some embodiments, the above-described asphalt-emulsion adhesive can be used in conjunction with a membrane. In some embodiments, the membrane can be permeable to the passage of water in vapor form, also known as water vapor. In some embodiments, the membrane can also be permeable to other types of vapors, such as those at least equal to or less in size than water in vapor form. In some embodiments, the sheet or film may be microporous, microperforated or some other type of vapor permeable sheet or film. The membrane may be 2, 3, 4, or 5 feet in width, although other widths may be used.

A microporous sheet or film can be a non-perforated continuous microfiber web with microscopic pores large enough for moisture vapor to pass through, but small enough to resist the movement of air and liquid water. Microperforated membrane properties can be adjusted through, for example, mechanical pin-perforations and/or film laminations. In some embodiments, the microporous sheet or film can be less permeable to the passage of water or moisture in liquid or bulk form as compared to a microperforated membrane.

In some embodiments, microporous sheets or films can be spunbonded or fibrous bonded polyolefin such as those described in U.S. Pat. Nos. 3,532,589 and 5,972,147, hereby incorporated by reference in their entirety; however other types of sheets or films may be used. For example, in some embodiments the sheet can be made from polyolefins, such as polyethylene and polypropylene. One such microporous sheet is available commercially under the trade-mark Tyvek®. Other example embodiments of microporous sheets can include oriented polymeric films such as those described in U.S. Pat. No. 5,317,035, hereby incorporated by reference in its entirety. In some embodiments, the polymer films can be formed from ethylene-propylene block copolymers. One such example film is commercially available as Aptr®. In some embodiments, the sheets or films may be reinforced with various types of scrim materials or may be laminated to other vapor permeable sheets or films, such as non-woven polypropylene or non-woven polyester for the purpose of improving strength and other physical properties.

In some embodiments, the membrane can have a thickness of about 0.001 to about 0.04 inches, and preferably a thickness of about 0.001 to about 0.025 inches. In some embodiments, the membrane can have a thickness of greater than 0.001, 0.002, 0.003, 0.004, 0.005, 0.006, 0.007, 0.008, 0.009, 0.010, 0.015, or 0.020 inches. In some embodiments, the membrane can have a thickness of less than 0.025, 0.020, 0.015, 0.010, 0.009, 0.008, 0.007, 0.006, or 0.005 inches. However, other membrane thicknesses may be used as well.

Water Vapor Impermeable Membrane

In some embodiments, the asphalt-emulsion adhesive can be used in conjunction with a water vapor impermeable membrane. Accordingly, even though the asphalt-emulsion adhesive can be water vapor permeable, the membrane may still prevent the passage of water vapor.

While the membrane may still contain some holes or perforations from manufacturing, they may be small enough so that water cannot pass through the membrane. Further, the membrane may not contain any holes or perforations, thereby also not allowing water vapor to pass through the membrane.

Water vapor impermeable membranes may be used, for example, when water vapor permeance is not required or desired. For example, an asphalt-membrane system may be used in roofing, where water vapor may not be advantageous. Therefore, the membrane itself may have other desirable properties, such as increased grip to a level which a water vapor permeable membrane may not be able to be achieved.

In some embodiments, the membrane can have a thickness of about 0.001 to about 0.04 inches, and preferably a thickness of about 0.001 to about 0.025 inches. In some embodiments, the membrane can have a thickness of greater than 0.001, 0.002, 0.003, 0.004, 0.005, 0.006, 0.007, 0.008, 0.009, 0.010, 0.015, or 0.020 inches. In some embodiments, the membrane can have a thickness of less than 0.025, 0.020, 0.015, 0.010, 0.009, 0.008, 0.007, 0.006, or 0.005 inches. However, other membrane thicknesses may be used.

In some embodiments, the membrane may include a combination of water vapor permeable and impermeable substances, so that portions of the membrane allow for water vapor to pass through, while other parts may not. The foregoing structure can advantageously be used to help direct to flow of water vapor in various applications.

Asphalt-Membrane System

In some embodiments, the disclosed asphalt-emulsion adhesive can be coated on a membrane such as those discussed above as a generally continuous film.

In some embodiments wherein a water vapor permeable system is to be produced, the entirety of the membrane can be coated by the asphalt-emulsion adhesive, as the asphalt-emulsion adhesive can be water vapor permeable as well. Therefore, water vapor can pass through the adhesive and the membrane, even if the membrane is fully and continuously coated by the adhesive. This can be advantageous as compared to other adhesives, such as conventional hot-formed adhesives, which are not water vapor permeable and can require a non-continuous coating in order to leave parts, spots, or zones of the membrane uncoated with adhesive. Of course, in some embodiments the asphalt-emulsion adhesive can still be formed as a non-continuous coating if, for example, less adhesive is desired to be used.

Figure 1B:
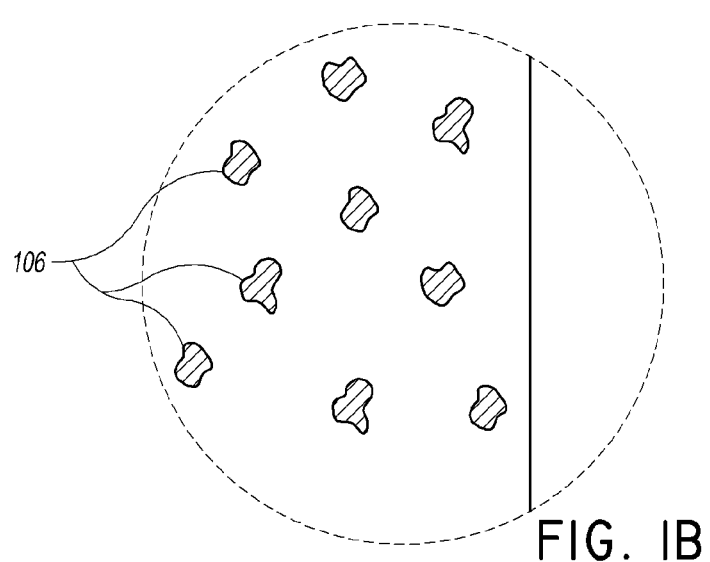
FIG. 1B shows an embodiment of a membrane with an asphalt-emulsion adhesive at a microscopic level.

FIGS. 1A-1B illustrates an example embodiment of an asphalt-membrane system 100 including an embodiment of the above described membrane 102 and an embodiment asphalt-emulsion adhesive 104. As shown, the adhesive 104 can continuously cover the membrane 102 so that no macroscopic discontinuous sections can be seen. In some embodiments, a non-continuous adhesive layer may be used.

However, upon a microscopic look at the example adhesive 104, shown in FIG. 1B, structural imperfections 106 can be found, which can be caused by, for example, the filler used in the asphalt-emulsion adhesive 104. These microscopic imperfections 106 can enable water vapor to pass through the adhesive 104 and reach the membrane 102, which may or may not be permeable to water vapor, depending on how the asphalt-membrane system 100 is to be used. If the membrane 102 is water vapor permeable, water vapor can pass completely through the system 100, thereby assisting in regulating water vapor levels.

In some embodiments, the asphalt-membrane system 100 can be formed into a self-adhering sheet, where the sheet can optionally be protected with a strippable release sheet liner (not shown). This can enable packaging the asphalt-membrane system 100 into rolls, while avoiding sticking between layers. The asphalt-membrane system 100 can adhere to the release liner through the asphalt-emulsion adhesive 104. The release liner can comprise, for example, a silicone surface or a treated plastic film, which can permit ready separation of the asphalt-membrane system 100 from the release liner so that the asphalt-membrane system 100 can be used.

As mentioned above, the asphalt-emulsion adhesive can be applied in a discontinuous manner, as well as a continuous manner. If a discontinuous coating is used (e.g., to prevent lateral movement of air between the membrane and the substrate to which it is bonded and through lap joints of the membrane), the adhesive coated areas of the membrane can be made to intersect to isolate the uncoated areas, thereby eliminating channels through which air can laterally move. This can be achieved by any number of patterns, such as intersecting circles with adhesive free centers, intersecting squares or rectangles of adhesive, intersecting strips in a checkered pattern, etc. In general, the adhesive film can form an adhesive sea on the membrane surface, with a multitude of membrane islands, surrounded by but not covered by the adhesive sea.

The adhesive may suitably be applied so as to cover about 5%, 10%, 15%, 20%, 25%, 30%, 40%, or 50%, to about 60%, 70%, 80%, 90%, 95%, 96%, 97%, 98%, 99% or 100% of the area of one side of the membrane. Further, about 100%, 99%, 98%, 97%, 96%, 95% or 90% or less of the membrane can be coated. As mentioned above, about 100% of the area of one side of the membrane can be coated with the disclosed asphalt emulsion, while still retaining high water vapor permeance.

In some embodiments, the use of a liquid primer coating may be used to improve adhesion of the membrane to some substrates. In the case of a vapor permeable membrane, the primer can be selected from certain materials or applied at a reduced rate or in a manner such that the breathability of the assembly is not compromised.

In some embodiments, about 0.0098, 0.010, 0.015, or 0.020 inches to about 0.25, 0.30, 0.35, or 0.04 inches of dry thickness adhesive can be applied. In some embodiments, the adhesive can reduce in thickness upon drying, so a larger thickness of liquid adhesive may be applied to achieve the dry thickness.

Embodiments of the asphalt-membrane system can be used, for example, on housing/structures, such as on roofs and exterior walls. In some embodiments, the disclosed membrane is configured to satisfy the ASTM D1970 standard for self-adhering polymer modified bituminous sheet materials used as steep roofing underlayment for ice dam protection, hereby incorporated by reference in its entirety. In some embodiments, the disclosed membrane is configured to satisfy the ASTM E2178 standard for adhered sheet air barrier, hereby incorporated by reference in its entirety. In some embodiments, the membrane can meet the ABAA specification for self-adhered air barriers. In some embodiments, the membrane can perform with a maximum of 0.02 l/s m$^2$ at 75 Pa or 0.004 cfm/ft$^2$.

Use of Asphalt-Membrane System in Structural Feature

The asphalt-membrane system disclosed above can be employed in a building structure, such as a wall structure or a roof structure. While the below description discusses the use of a water vapor permeable and impermeable membranes, it should be understood that the type of membrane is not limiting, and the membrane type can be chosen depending on the application.

A vapor permeable membrane, such as those described above, can be employed in a building structure in conjunction with a vapor impermeable barrier sheet. In some embodiments, the water vapor permeable membrane can be a polyethylene sheet having a water vapor permeance of not more than about 15 ng/Pa·s·m$^2$ (ASTM E 96). Such a sheet may be considered a vapor retarder, since it is not completely impermeable to water vapor. In some embodiments, the barrier sheet has a thickness of about 0.001 to about 0.008 inches, and preferably between about 0.002 to about 0.006 inches.

Figure 2:
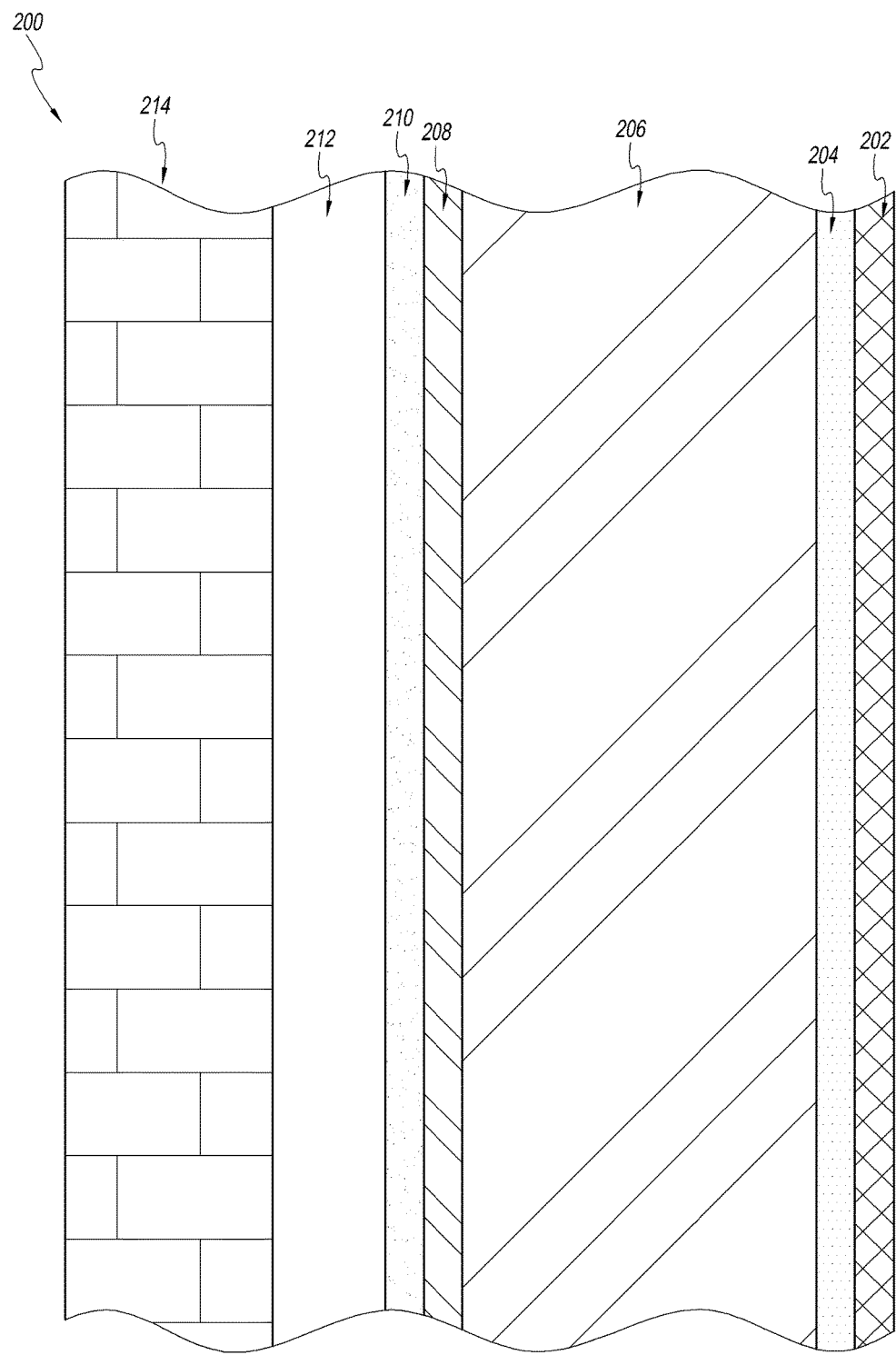
FIG. 2 shows a side of a building with an embodiment of the disclosed asphalt-membrane system.

As shown in FIG. 2, a wall structure assembly 200 can include, for example, an interior wall panel 202 and an exterior wall structure 214. In some embodiments, the interior wall panel 202 can be formed of gypsum, although other types of materials may be used. A vapor impermeable barrier sheet 204, for example a polyethylene sheet, can be mounted adjacent interior wall panel 202. This vapor impermeable barrier sheet 204 can block water from moving into the interior of the building, so that the water remains exterior to the building. In some embodiments, the water vapor impermeable barrier sheet 204 can be combined with an embodiment of the asphalt-emulsion adhesive described above.

A second or exterior wall panel 208 can be disposed in spaced relationship with interior wall panel 202, between panel 202 and the external wall structure 214. Further insulation 206 can be disposed between wall panel 208 and barrier sheet 204. A vapor permeable membrane 210 can adhered to panel 208. In some embodiments, the water vapor permeable membrane 210 can be combined with an embodiment of the asphalt-emulsion adhesive described in above.

External wall structure 214 may, for example, comprise bricks and mortar, though other materials, such as polymer siding, can be used in addition or instead.

In some embodiments, the wall structure assembly 200 may include an air cavity 212 between external wall structure 214 and sheet 210, and optionally, there may be further insulation (not shown) in this cavity. The air cavity 212 may be used to circulate water vapor that has been removed from the building through membrane 210.

As shown in the above FIG. 2, an external water vapor permeable membrane can be used in conjunction with an internal water vapor impermeable membrane. Therefore, water vapor can only move from inside the walls to external of the structure. This can provide benefits such as keeping water vapor outside of the structure, thus reducing mold or other deleterious effects of water vapor. Embodiments of the asphalt-emulsion adhesive can be used in conjunction with at least one of the membranes.

Method of Preparing Asphalt-Membrane System

Figure 3:
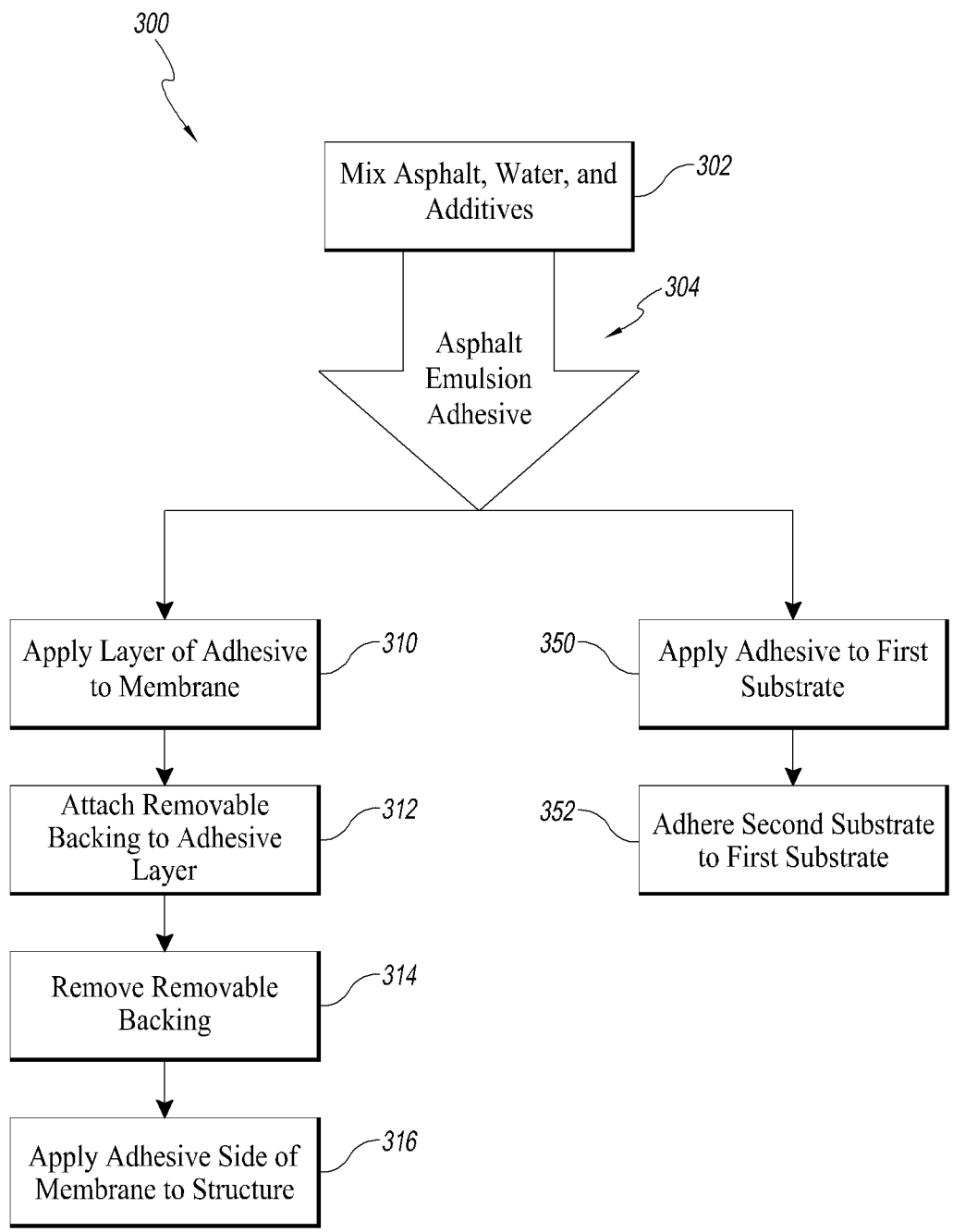
FIG. 3 shows embodiments of a method of forming and use of a disclosed asphalt-membrane system.

FIG. 3 illustrates an embodiment of a method 300 for preparing an asphalt-membrane system, such as those disclosed above. Asphalt, water, and other additives, such as those described above, can be mixed together 302. As described above, asphalt can optionally be combined with other materials, such as emulsifiers or fillers, in order to form the asphalt-emulsion adhesive. The ingredients can be mixed together 302, optionally using methods known in the art, and in certain embodiments no additional requirements are necessary. The mixing of the ingredients can form an asphalt-emulsion adhesive 304. The formation of the adhesive 304 does not require any step of heating (relative to the ambient temperature). Therefore, the asphalt, water, and other additives can be mixed together at ambient temperatures.

After preparing the asphalt-emulsion adhesive, the adhesive can be used in numerous manners, two examples of which are outlined with respect to FIG. 3. However, these methods can be done in conjunction with one another, and other methods may be used.

In one example method, the asphalt-emulsion adhesive 304 can be applied as a layer to a membrane. The membrane can be, for example, rectangular, triangular, circular, or irregular in shape. The membrane can be water vapor permeable, partially permeable, or impermeable. The adhesive can then be applied onto the membrane 310, thereby forming an asphalt-membrane system. In some embodiments, the asphalt-emulsion adhesive 304 is applied continuously to the membrane, and in some embodiments is applied non-continuously to the membrane. The adhesive 304 can be applied on a horizontal plane. The membrane can travel on a machine, such as a belt, and the adhesive 304 can be sprayed onto the membrane wet, as in sprayed as a liquid. The coated membrane can then be oven flashed to dry. In some embodiments, a removable backing, such as the one described above, can be attached 312 in order to store and or transport the system. However, this step is optional, and the backing need not be used.

When the system is ready to be used, the backing can be removed 314. However, as described with respect to step 312, a backing need not be used and this step is only applicable if a backing is used. Once the system is free, it can be applied adhesive side down to a structure 316. This application can be done, for example, with rollers or with spray, although other application devices and techniques may be used. In some embodiments, the adhesive can be applied to a structure first, and the membrane can be pressed onto the adhesive coated structure.

In one method, the asphalt-emulsion adhesive 304 can be applied to a first substrate 350. This can be done, for example, by rollers, by spraying, or by other means. The adhesive 304 can be applied continuously or discontinuously. In some embodiments, the first substrate may be, for example, a fixed surface such as a wall, a roof, or other building structure. In some embodiments, the first substrate may be a movable surface such as, for example, a board, a frame, a window, or drywall, although other substrates may be used. A second substrate can then adhere to the first substrate, or vice versa 352. Similar to the first substrate, the second substrate can be a fixed or movable surface, and the type of substrate is not limiting.

In both of the methods described above with respect to FIG. 3, as well as any other methods using the asphalt-emulsion adhesive, the methods can be performed in low temperatures, such as in winter climates. For example, the adhesive can be applied from about −4° C. to about 40° C. Therefore, the asphalt-emulsion adhesive does not require any heating before application, and can be easily applied in cold weather climates. Further, the adhesive can have a service temperature of about −40° C. to about 80° C. Accordingly, the adhesive can be used in cold weather climates, and can handle low temperatures without losing adhesive qualities.

From the foregoing description, it will be appreciated that an inventive cold applied asphalt emulsion and method of making are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A self-adhering, water vapor permeable multilayer sheet material for structural surfaces of buildings comprising:
    a water vapor permeable membrane selected from the group consisting of a water vapor permeable flexible sheet and a water vapor permeable flexible film; and
    a water vapor permeable aqueous asphalt-emulsion dried adhesive layer on at least one side of the membrane, the adhesive consisting of;
    about 0 to about 22% by weight of an acrylic polymer; about 30 to about 36% by weight of asphalt; about 28 to about 40% by weight of water; between about 2 and 3.2% by weight of glycol; and up to about 42% by weight of at least one filler forming at least one passage for water vapor through the adhesive layer;
    wherein the multilayer sheet material has a service temperature of about −40° C. to about 80° C.

2. The multilayer sheet material of claim 1, wherein the asphalt-emulsion adhesive on the membrane is a continuous layer.

3. The multilayer sheet material of claim 1, wherein the asphalt-emulsion adhesive on the membrane is a discontinuous layer.

4. The multilayer sheet material of claim 1, wherein the water vapor permeable membrane comprises a microporous sheet or film of a spunbonded or fibrous bonded polyolefin.

5. The multilayer sheet material of claim 1, wherein the filler comprises calcium carbonate, titanium dioxide, black iron, aluminum trihydrate, elastomeric polymers and fibers selected from the group of polyamide fibers, polyester, polypropylene and polyurethane.

6. The multilayer sheet material of claim 1, wherein the structural surface to which the material is applied is a wall.

7. A self-adhering, water vapor permeable multilayer sheet material for structural surfaces of buildings comprising:
    a water vapor permeable membrane selected from the group consisting of a water vapor permeable flexible sheet and a water vapor permeable flexible film; and
    a water vapor permeable aqueous asphalt-emulsion dried adhesive layer on at least one side of the membrane, the adhesive consisting of;
    about 0 to about 22% by weight of an acrylic polymer; about 30 to about 36% by weight of asphalt; about 28 to about 40% by weight of water; about 2 to about 3.2% by weight of glycol; and up to about 42% by weight of at least one filler forming at least one passage for water vapor through the adhesive layer; and an epoxidized soy bean oil;
    wherein the multilayer sheet material has a service temperature of about −40° C. to about 80° C.

\* \* \* \* \*